US009486745B2

(12) United States Patent
Takagi et al.

(10) Patent No.: US 9,486,745 B2
(45) Date of Patent: Nov. 8, 2016

(54) SEMIPERMEABLE MEMBRANE AND MANUFACTURING METHOD THEREFOR

(75) Inventors: Kentaro Takagi, Otsu (JP); Tomoko Mitsuhata, Otsu (JP); Takao Sasaki, Otsu (JP); Takeharu Inoue, Ehime (JP); Takashi Yoshino, Ehime (JP); Kiyohiko Takaya, Otsu (JP); Yutaro Suzuki, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 349 days.

(21) Appl. No.: 13/508,693

(22) PCT Filed: Dec. 20, 2010

(86) PCT No.: PCT/JP2010/072924
§ 371 (c)(1),
(2), (4) Date: Jun. 8, 2012

(87) PCT Pub. No.: WO2011/078131
PCT Pub. Date: Jun. 30, 2011

(65) Prior Publication Data
US 2012/0261332 A1    Oct. 18, 2012

(30) Foreign Application Priority Data

Dec. 22, 2009   (JP) .................................. 2009-290218
Jan. 12, 2010   (JP) .................................. 2010-003661

(51) Int. Cl.
| | | |
|---|---|---|
| B01D 39/00 | (2006.01) | |
| B01D 39/14 | (2006.01) | |
| B05D 5/00 | (2006.01) | |
| B01D 67/00 | (2006.01) | |
| B01D 71/56 | (2006.01) | |
| C02F 1/44 | (2006.01) | |
| B01D 61/02 | (2006.01) | |
| C08K 5/23 | (2006.01) | |

(52) U.S. Cl.
CPC ........... B01D 67/0093 (2013.01); B01D 71/56 (2013.01); C02F 1/441 (2013.01); *B01D 61/025* (2013.01); *B01D 2323/12* (2013.01); *B01D 2323/30* (2013.01); *C08K 5/23* (2013.01)

(58) Field of Classification Search
CPC ...... B01D 71/56; B01D 71/68; B01D 71/16; B01D 71/42; B04D 5/00
USPC ........ 210/490, 500.38; 427/243–245; 264/48
See application file for complete search history.

(56) References Cited

U.S. PATENT DOCUMENTS

| | | | | |
|---|---|---|---|---|
| 3,835,207 | A * | 9/1974 | Frost et al. ..................... 264/41 |
| 4,277,344 | A * | 7/1981 | Cadotte ......................... 210/654 |
| 4,673,504 | A * | 6/1987 | Ostreicher et al. ...... 210/500.22 |
| 4,888,116 | A | 12/1989 | Cadotte et al. |
| 5,049,282 | A * | 9/1991 | Linder et al. ................. 210/651 |
| 5,234,598 | A * | 8/1993 | Tran et al. .................... 210/654 |
| 8,631,946 | B2 * | 1/2014 | Sasaki et al. ............ 210/500.38 |
| 2012/0261332 | A1 * | 10/2012 | Takagi et al. .............. 210/500.3 |
| 2012/0305473 | A1 * | 12/2012 | Ogawa et al. ........... 210/500.38 |
| 2014/0231338 | A1 * | 8/2014 | Takaya et al. ................ 210/489 |

FOREIGN PATENT DOCUMENTS

| | | | | |
|---|---|---|---|---|
| JP | 63-175604 | A | 7/1988 | |
| JP | 2005-186059 | A | 7/2005 | |
| JP | 2007-90192 | A | 4/2007 | |
| JP | 2009-255075 | A | 11/2009 | |
| JP | 5267273 | | * 5/2013 | ............. B01D 71/56 |

OTHER PUBLICATIONS

International Search Report issued in PCT/JP2010/072924, dated Mar. 15, 2011.

* cited by examiner

*Primary Examiner* — Ana Fortuna
(74) *Attorney, Agent, or Firm* — Birch, Stewart, Kolasch & Birch, LLP

(57) ABSTRACT

Provided is a semipermeable membrane having at least a separating functional layer, wherein azo compounds are retained in the separating functional layer, and the separating functional layer has a yellow index of 10 to 40. Also provided is a method of producing the semipermeable membrane. The present invention provides a semipermeable membrane having not only high water permeability but also high rejection performance even for substances that are nondissociative in the neutral range, such as boric acid, and showing high durability and a manufacturing method therefor.

8 Claims, No Drawings

SEMIPERMEABLE MEMBRANE AND MANUFACTURING METHOD THEREFOR

TECHNICAL FIELD

The present invention relates to a semipermeable membrane for selectively separating various mixed solutions and a manufacturing method therefor. The semipermeable membrane obtained by the present invention has high water permeability and durability and can be suitably used in selectively separating and removing boron contained in sea water or brackish water. Further, the present invention relates to a high-performance semipermeable membrane for selective permeation separation of components of a mixed aqueous solution of a plurality of salts and organic matter.

BACKGROUND ART

Regarding separation of a mixture, there are various techniques for removing substances (for example, salts) dissolved in a solvent (for example, water), and membrane separation processes have recently been used as a process for energy saving and resource saving. Examples of membranes used in membrane separation processes include, for example, a microfiltration membrane, an ultrafiltration membrane, and a reverse osmosis membrane. In more recent years, membranes that fall between the reverse osmosis membrane and the ultrafiltration membrane (loose RO membrane or NF membrane: nanofiltration membrane) have been developed and used. This technique even allows obtaining drinking water, for example, from sea water, brackish water, and water containing harmful substances, and, in addition, has been used, for example, in the production of industrial ultrapure water, wastewater treatment, and recovery of valuables.

Most of the composite semipermeable membranes that are commercially available at present fall within two types: one having on a porous support membrane a gel layer and an active layer in which polymers are cross-linked; and the other having on a porous support membrane an active layer produced by polycindensation of monomers.

In recent years, sea water desalination using a semipermeable membrane has been attempted and put to practical use in water treatment plants around the world. It is known that a semipermeable membrane generally comprises a porous support membrane coated with a separating functional layer, and that when the separating functional layer is formed from cross-linked aromatic polyamide, the semipermeable membrane has high stiffness due to the presence of benzene rings, an advantage in that the membrane can be readily produced by interfacial polycondensation of aromatic polyfunctional amines with aromatic polyfunctional acid halides, and, in addition, a high salt removal rate and a high permeate flux.

Boron, which is toxic to human bodies, plants, and animals in that, for example, it causes neuropathy and growth inhibition, is contained in large amounts in sea water, and therefore it is important to remove boron in seawater desalination.

PRIOR ART DOCUMENTS

Patent Documents

Boron removal is important in seawater desalination as described above, and various means of improving boron removal performance of various semipermeable membranes have been purposed (Patent Document 1 and Patent Document 2). In Patent Document 1, a method of heat treating a composite semipermeable membrane formed by interfacial polymerization to improve the performance is disclosed. In Patent Document 2, a method of contacting a composite semipermeable membrane formed by interfacial polymerization with a bromine-containing free chlorine water solution is disclosed.

In water generation plants where reverse osmosis membranes are used, higher water permeation performance is demanded in order to further reduce running costs. For such a demand, methods of treating a semipermeable membrane with a chlorine water solution (Patent Document 3) and with a nitrous acid solution (Patent Document 4 and Patent Document 5) are disclosed.

Further, methods of treatment with a reagent such as iodine or sulfamic acid are disclosed (Patent Documents 6 and 7).

Patent Document 1: JP 11-19493 A
Patent Document 2: JP 2001-259388 A
Patent Document 3: JP 63-54905 A
Patent Document 4: JP 63-175604 A
Patent Document 5: JP 2005-177741 A
Patent Document 6: JP 2006-21094 A
Patent Document 7: JP 2008-260009 A

SUMMARY OF THE INVENTION

Problems to be Solved by the Invention

However, even the membranes described in Patent Document 1 and Patent Document 2 have a membrane permeate flux of 0.5 $m^3/m^2$/day or less and a boron removal rate of at most about 91 to 92% when the sea water of 25° C., pH: 6.5, boron concentration: 5 ppm, and total dissolved solids concentration (hereinafter referred to as TDS concentration): 3.5% by weight is passed therethrough at an operating pressure of 5.5 MPa, and there has been a need for development of a semipermeable membrane having even higher boron rejection performance.

The membrane of Patent Document 3 treated with a chlorine water solution has still an insufficient durability because the membrane causes deterioration such as reduction in salt removal rate when treated, for example, with chlorine or hydrogen peroxide used for sterilizing the membrane, thereby requiring restrictions on the operating conditions when used. Although there is disclosed that the membranes of Patent Document 4 and Patent Document 5 treated with a nitrous acid solution provide a semipermeable membrane having durability as well as a certain degree of solute removal properties and water permeability, the membrane performance specifically described in these documents does not sufficiently satisfy the requirements for water quality, and there has been a need for development of a semipermeable membrane having even higher performance.

The method in Patent Document 6 improves neutral molecule removal rate while maintaining ion removal rate but has a problem in that the permeate flow rate decreases by 20% or more compared to that of a composite semipermeable membrane before treatment. The method in Patent Document 7 improves permeate flow rate while maintaining ion removal rate but has a problem in that it does not improve neutral molecule removal rate.

An object of the present invention is to solve the above-described problems. Specifically, an object of the present invention is to provide a semipermeable membrane having not only high water permeability but also high removal performance even for substances that are nondissociative in the neutral range, such as boric acid, and showing high durability.

Means for Solving the Problems

The object of the present invention is achieved by the semipermeable membrane below.

A semipermeable membrane having at least a separating functional layer, wherein azo compounds are retained in the separating functional layer, and the separating functional layer has a yellow index of 10 to 40.

Further, the object of the present invention is achieved by either of the production method (A) or (B) below.

(A) A method of producing the semipermeable membrane having at least a separating functional layer, the method comprising the steps of: forming a semipermeable membrane having a m-phenylenediamine solute permeability coefficient in the range of $5.0 \times 10^{-7}$ to $1.0 \times 10^{-7}$ cm/sec; retaining the amines in the separating functional layer of the semipermeable membrane in an amount in the range of 0.5% by weight to 2.0% by weight; and then contacting the semipermeable membrane with a solution containing a compound that reacts with primary aromatic amino groups and forms a diazonium salt or derivatives thereof, a modification process A, or (B) a method of producing a composite semipermeable membrane comprising a porous support membrane on which a separating functional polyamide layer resulting from polycondensation reaction of polyfunctional aromatic amines with polyfunctional acid halides is formed, the method comprising the steps of: retaining the amines in the separating functional layer of the semipermeable membrane in an amount in the range up to 2.0% by weight: contacting the semipermeable membrane with a solution containing a compound that reacts with primary aromatic amino groups and forms a diazonium salt or derivatives thereof, the modification process A; and then contacting the semipermeable membrane with a solution containing a compound that reacts with the diazonium salt and induces a diazo coupling reaction, a modification process B, and contacting the semipermeable membrane with a solution containing a reducing agent, a modification process C.

In the semipermeable membrane of the present invention, the amount of azo compounds retained in the separating functional layer is preferably in the range of 0.05% by weight to 0.5% by weight.

In the semipermeable membrane of the present invention, in the case of a semipermeable membrane provided on its base material with a separating functional layer, it is preferred that azo compounds be retained in parts excluding the base material in the semipermeable membrane in an amount in the range of 0.05% by weight to 0.5% by weight.

In the semipermeable membrane of the present invention, in the case of a composite semipermeable membrane in which a separating functional layer is provided on a porous support membrane formed by casting a resin on a base material, it is preferred that azo compounds be retained in parts excluding the base material in the semipermeable membrane in an amount in the range of 0.05% by weight to 0.5% by weight.

In the semipermeable membrane of the present invention, in the case of a composite semipermeable membrane comprising a porous support membrane on which a separating functional polyamide layer resulting from polycondensation reaction of polyfunctional aromatic amines with polyfunctional acid halides is formed, it is preferred that the ratio of the number of azo groups to the number of benzene rings in the separating functional polyamide layer be in the range of 0.01 to 0.1 and that the content of azo compounds in parts excluding the base material in the composite semipermeable membrane be less than 0.05% by weight.

In the semipermeable membrane of the present invention, the separating functional layer is preferably made of at least one material selected from polyacrylonitrile, cellulose acetate, sulfonated polysulfone, and carboxylated polysulfone.

EFFECTS OF THE INVENTION

The present invention provides a semipermeable membrane that has high desalination performance and is capable of rejecting at a high removal rate even substances that are nondissociative in the neutral range, which substances have been hardly rejected to a high extent by conventional semipermeable membranes. Therefore, this semipermeable membrane is capable of rejecting at a high removal rate, particularly, boron which has been hardly rejected to a high extent in desalination of sea water, and therefore can be suitably used in production of drinking water by reverse osmosis treatment.

BEST MODE FOR CARRYING OUT THE INVENTION

The semipermeable membrane according to the present invention is a semipermeable membrane having at least a separating functional layer, wherein azo compounds are retained in the separating functional layer, and the separating functional layer has a yellow index of 10 to 40. Preferably, the semipermeable membrane according to the present invention is a semipermeable membrane produced by contacting a semipermeable membrane having at least a separating functional layer containing primary amino groups or salts thereof with a reagent that reacts with primary amino groups and forms a diazonium salt or derivatives thereof, wherein the separating functional layer has a yellow index of 10 to 40. The diazonium salt or derivatives thereof, because of their high reactivity, binds to an organic compound contained in the separating functional layer to form azo compounds and modifies the properties of the semipermeable membrane.

In the present invention, the semipermeable membranes are classified into those in which a separating functional layer that substantially has separation performance is self-supporting similarly to commercially available hollow fiber RO membranes, those in which a porous support membrane that substantially does not have separation performance is coated with a separating functional layer that substantially has separation performance, and those in which a base material is coated with a polymer layer having a separating functional layer. Among them, preferred are those in which a porous support membrane that substantially does not have separation performance is coated and those in which a base material is coated with a polymer layer having a separating functional layer.

The separating functional layer is preferably of a material that has high water permeability such as membrane permeate flux and readily increase selective separation performance, and, for example, polyamide, polyester, cellulose and acyl esters thereof (such as cellulose acetate), polyacrylonitrile, polyacrylic acid and esters thereof, polymethacrylic acid and esters thereof, sulfonated polysulfone, hydrocarbonylated polysulfone, and the like can be used. In particular, polyamide can increase both permeate flux and solute removal rate. Further, a material containing cross-linked polyamide is more preferred because the chemical stability to acid and alkali can be simultaneously improved.

The polyamide constituting the separating functional layer is formed by interfacial polycondensation of polyfunctional amines with polyfunctional acid halides, and at least one of polyfunctional amine components and polyfunctional acid halides components preferably contain a tri- or more functional compound. Here, at least one of the polyfunctional amines and the polyfunctional acid halides preferably contains a tri- or more functional compound.

Although the separating functional layer may be provided on both sides of the porous support membrane or may be provided on a base material as a polymer layer having the separating functional layer, or a plurality of separating functional layers may be provided, in general, one separating functional layer on one side suffices.

The polyfunctional amine is composed of at least one of the components, aromatic polyfunctional amines and aliphatic polyfunctional amines.

An aromatic polyfunctional amine refers to an aromatic amine having two or more amino groups in one molecule, examples of which include, but are not limited to, m-phenylenediamine, p-phenylenediamine, 1,3,5-triaminobenzene, 3,5-diaminobenzoic acid, 3-aminobenzylamine, 4-aminobenzylamine, and the like. Examples of N-allcylates thereof include, for example, N,N-dimethyl m-phenylenediamine, N,N-diethyl m-phenylenediamine, N,N-dimethyl p-phenylenediamine, and N,N-diethyl p-phenylenediamine, and, in particular, m-phenylenediamine and 1,3,5-triaminobenzene are preferred in terms of stability in performance exhibition.

An aliphatic polyfunctional amine refers to an aliphatic amine having two or more amino groups in one molecule, preferably a piperazine-based amine and derivatives thereof. Example thereof include, for example, ethylenediamine, propylenediamine, 1,2-diaminocyclohexane, 1,4-diaminocyclohexane, 4-aminopiperidine, piperazine, 4-aminoethylpiperazine, 2,5-dimethylpiperazine, 2-methylpiperazine, 2,6-dimethylpiperazine, 2,3,5-trimethylpiperazine, 2,5-diethylpiperazine, 2,3,5-triethylpiperazine, 2-n-propylpiperazine, and 2,5-di-n-butylpiperazine, and, in particular, piperazine and 2,5-dimethylpiperazine are preferred in terms of stability in performance exhibition. These polyfunctional amines can be used alone or may be used in combination.

A polyfunctional acid halide refers to an acid halide having two or more halogenated carbonyl groups in one molecule and is not particularly restricted as long as it reacts with the above-described amine to give polyamide. As a polyfunctional acid halide, for example, an acid halide of oxalic acid, malonic acid, maleic acid, fumaric acid, glutaric acid, 1,3,5-cyclohexanetricarboxylic acid, 1,3-cyclohexanedicarboxylic acid, 1,4-cyclohexanedicarboxylic acid, 1,3,5-benzenetricarboxylic acid, 1,2,4-benzenetricarboxylic acid, 1,3-benzenedicarboxylic acid, or 1,4-benzenedicarboxylic acid can be used. Among acid halides, acid chlorides are preferred, and trimesic acid chloride, which is an acid halide of 1,3,5-benzenetricarboxylic acid, is preferred particularly in terms of economy, availability, handleability, reactivity, and the like. The above-described polyfunctional acid halides can be used alone or may be used in combination.

In the present invention, yellow index refers to the extent to which the hue of a polymer is away from colorless or white to the yellow direction expressed as a positive quantity, as defined in Japanese Industrial Standard JIS K 7373.

The yellow index of the separating functional layer is measured using a color meter. For example, in the case of measuring the yellow index of a semipermeable membrane provided on its porous support membrane with a separating functional layer, measurements are made by placing the semipermeable membrane on a glass plate with the separating functional layer surface down, dissolving and removing the porous support membrane with a solvent that dissolves only the porous support membrane, and performing the transmission measurement of the separating functional layer sample remaining on the glass plate. In placing the semipermeable membrane on the glass plate, the base material for reinforcing the porous support membrane mentioned below is peeled off in advance. In the case of measuring a semipermeable membrane having a separating functional layer that substantially does not transmit light, the yellow index is measured by reflection measurement. As a color meter, for example, SM color computer SM-7 manufactured by Suga Test Instruments Co., Ltd. can be used.

In addition, in the present invention, the yellow index of the separating functional layer in the semipermeable membrane is 10 to 40. When the yellow index of the separating functional layer is not less than 10, boron removal performance can be fully exerted, and when not more than 40, a semipermeable membrane having high water permeability can be obtained.

The separating functional layer having a yellow index of not less than 10 is a separating functional layer having in the separating functional layer such a structure that an aromatic ring bears an electron-donating group and an electron-withdrawing group and/or such a structure that conjugation extends. Examples of electron-donating groups include, for example, hydroxyl groups, amino groups, and alkoxy groups. Examples of electron-withdrawing groups include, for example, carboxyl groups, sulfonic groups, aldehyde groups, acyl groups, aminocarbonyl groups, aminosulfonyl groups, cyano groups, nitro groups, and nitroso groups. Examples of such a structure that conjugation extends include, for example, polycyclic aromatic rings, polycyclic hetero rings, ethenylene groups, ethynylene groups, azo groups, imino groups, arylene groups, heteroarylene groups, and combinations of these structures. The separating functional layer exhibits the yellow index of not less than by having such a structure. However, when the amount of such a structure is increased, the yellow index becomes larger than 40. Further, when such a structure is multiply combined, the region of such a structure becomes large and turns red, resulting in a yellow index of larger than 40. If the amount of such a structure is increased and the region of such a structure is increased to the extent that the yellow index becomes larger than 40, pores on the surface and inside the separating functional layer are clogged to thereby increase the boron removal rate, but the permeate water volume significantly decreases. When the yellow index is 10 to 40, the boron removal rate can be increased without excessively decreasing the permeate water volume.

Examples of the method of providing the separating functional layer with the above-described structure include supporting the separating functional layer by a compound having the above-described structure and/or chemically treating the separating functional layer to provide the above-described structure. For retaining the above-described structure over a long period of time, chemically treating the separating functional layer to provide the above-described structure is preferred.

Examples of the method of chemically treating the separating functional layer include contacting a semipermeable membrane in which the separating functional layer has primary amino groups with a reagent that reacts with primary amino groups and forms a diazonium salt or derivatives thereof. The diazonium salt or derivatives thereof thus formed react with an aromatic compound to form azo groups. These azo groups extend the conjugated structure, whereby the absorption shifts to the long-wavelength side, and therefore the separating functional layer is colored yellow to orange, resulting in a yellow index of not less than 10. Further, for achieving a yellow index of 10 to 40, the concentration of a compound having primary amino groups in the semipermeable membrane after contacting the compound having primary amino groups with the separating functional layer is preferably in the range of $30 \times 10^{-6}$ to $160 \times 10^{-6}$ mol/g.

The azo compound in the present invention is an organic compound having an azo group (—N=N—), and when a semipermeable membrane having a separating functional layer containing primary amino groups is contacted with a reagent that reacts with primary amino groups and forms a diazonium salt or derivatives thereof, the azo compound is formed in the separating functional layer and retained.

The separating functional layer containing primary amino groups herein refers to the presence of a compound and a salt thereof having at least one primary amino group (—$NH_2$) in the separating functional layer. Although the type of the compound is not limited, examples thereof include aromatic amines, aliphatic amines, polyvinyl amines, polyamides or peptides having a terminal amino group, and the like. The primary amino groups are preferably aromatic amines in terms of convenience in handling. Such primary amino groups may be a component of the separating functional layer, or a compound having primary amino groups may be present in the separating functional layer without the primary amino groups' chemically binding to the separating functional layer.

In the present invention, examples of the reagent that reacts with primary amino groups and forms a diazonium salt or derivatives thereof include aqueous solutions of for example, nitrous acid and/or a salt thereof, and a nitrosyl compound. Since the aqueous solution of nitrous acid and a nitrosyl compound readily generate gas and decompose, it is preferable to sequentially generate nitrous acid by the reaction, for example, between nitrite and an acidic solution.

Further, in the semipermeable membrane of the present invention, when the semipermeable membrane takes the embodiment of a composite semipermeable membrane in which a separating functional layer is provided on a porous support membrane formed by casting a resin on a base material, azo compounds are preferably retained in parts excluding the base material in the semipermeable membrane in an amount in the range of 0.05% by weight to 0.5% by weight. When the semipermeable membrane takes the embodiment of a semipermeable membrane provided on its base material with a separating functional layer, azo compounds are preferably retained in parts excluding the base material in the semipermeable membrane in an amount in the range of 0.05% by weight to 0.5% by weight. When the azo compound content is in this range, a semipermeable membrane achieving a balance between high solute removal properties and high water permeability can be obtained.

In the present invention, the content of azo compounds contained in the separating functional layer of the semipermeable membrane represents the amount in terms of chrysoidine ($C_{12}H_{13}ClN_4$), which is a known azo compound. Considering that it is difficult to understand the precise chemical structure of an azo compound and that, although the absorption band of an azo compound varies depending on the compound, in the present invention, the azo compound extracted into ethanol from a separating functional layer denatured by immersing a semipermeable membrane in ethanol expresses an absorption at a wavelength of about 450 nm, that is, has an absorption at the same belt-shaped domain as that of chrysoidin, the definition was made as described above.

Specifically, the content of azo compounds is determined as follows: that is, a semipermeable membrane is cut into 10 cm×10 cm, and a base material is peeled off to obtain a complex of a cast formation composed of a resin with a separating functional layer. This is immersed in 50 g of ethanol for 8 hours, and the components extracted with ethanol are analyzed using an UltraViolet-Vis-Near Infra-Red spectrophotometer. As an UltraViolet-Vis-Near Infra-Red spectrophotometer, for example, UV-2450 manufactured by Shimadzu Corporation can be used. Then, the complex of a cast formation composed of a resin with a separating functional layer is taken out from the ethanol, dried by heating at 120° C. for 2 hours, cooled to room temperature in a desiccator, and then weighed. The azo compound content in parts excluding the base material in the semipermeable membrane is calculated from the absorbance of the components extracted with ethanol at 450 nm, the calibration curve of the absorbance of chrysoidine, a reference material, at a wavelength of 450 nm, and the dried membrane weight.

On the other hand, when azo groups from which the yellow index is derived chemically bind to polyamide, it is preferable in that its structure is stably retained, and when the semipermeable membrane of the present invention is a composite semipermeable membrane comprising a porous support membrane on which a separating functional polyamide layer resulting from polycondensation reaction of polyfunctional aromatic amines with polyfunctional acid halides is formed, it is preferred that the ratio of the number of azo groups to the number of benzene rings in the separating functional polyamide layer be in the range of 0.01 to 0.1, more preferably 0.01 to 0.05, and that the content of azo compounds in parts excluding the base material in the composite semipermeable membrane be less than 0.05% by weight. Within the above-described ranges, it can be assumed that the azo groups chemically bind to polyamide, and a composite semipermeable membrane having high durability and long-term operation stability can be provided.

In the present invention, the ratio of the number of azo groups to the number of benzene rings in the separating functional polyamide layer is measured according to the NMR method. For example, for a liquid separation membrane having a separating functional polyamide layer on a porous support membrane formed by casting polysulfone on a base material, the ratio of the number of azo groups to the number of benzene rings is measured according to the NMR method as follows: First, a portion of the porous support membrane, a base material (taffeta or nonwoven fabric made of polyester fibers) is peeled off to obtain a complex of a cast formation composed of polysulfone with a separating functional layer of cross-linked polyamide. This is immersed in methylene chloride, and the resulting mixture is stirred to dissolve only polysulfone components, after which filtration is carried out to obtain a separating functional polyamide layer. The separating functional polyamide layer is dried and then collected in a hermetically-sealed container to measure the solid-state NMR of carbon. The ratio of the number of azo groups to the number of benzene rings is determined from the chemical shift value of the carbon adjacent to an azo group (about 152 ppm).

The method of producing the semipermeable membrane of the present invention will now be described.

In the separating functional layer constituting the semipermeable membrane, the skeleton can be formed, for example, by carrying out interfacial polycondensation on the surface of a porous support membrane using an aqueous solution that contains the above-described polyfunctional amine and an organic solvent solution that contains polyfunctional acid halides and is immiscible with water.

The concentration of polyfunctional amines in the aqueous polyfunctional amine solution is preferably in the range of 0.1 to 10% by weight, and more preferably in the range of 0.5 to 5.0% by weight. When the concentration of polyfunctional amines is in this range, the reaction proceeds moderately, while sufficient water permeability can be ensured because the separating functional layer is not excessively thick. The aqueous polyfunctional amine solution may contain, for example, surfactants, organic solvents, alkaline compounds, and antioxidants as long as the reaction of polyfunctional amines with polyfunctional acid halides is not impeded. Surfactants have an effect of improving the wettability on the porous support membrane surface and reducing the interfacial tension between the aqueous polyfunctional amine solution and an organic solvent. Organic solvents can serve as a catalyst for an interfacial polycondensation reaction, and the interfacial polycondensation reaction can be carried out efficiently by adding them.

In the present invention, the porous support membrane, which substantially does not have separation performance for ions and the like, is for the purpose of imparting strength to a separating functional layer that substantially has separation performance. The size and distribution of the pores are not particularly restricted, and preferred is, for example, a support membrane having uniform micropores or micropores gradually increasing in size from the surface on which the separating functional layer is formed to the other surface, wherein the size of the micropores on the surface on which the separating functional layer is formed is from 0.1 nm to 100 nm. Examples of materials used for the porous support membrane and the shapes thereof include, but are not limited to, a membrane formed by casting a resin on a support (base material), for example.

Examples of the base material include a fabric mainly composed of at least one selected from polyester and aromatic polyamide. As a resin cast on the base material, for example, polysulfone, cellulose acetate, polyvinyl chloride, or a mixture thereof is preferably used, and it is particularly preferable to use polysulfone, which has high chemical, mechanical, and thermal stability.

Specifically, it is preferable to use polysulfone comprising the repeating unit shown in the chemical formula below because of the easiness of controlling the pore size and high dimensional stability.

[Chemical Formula 1]

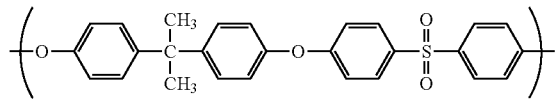

For example, a solution of the above-described polysulfone in N,N-dimethylformamide (DMF) is cast on a densely-woven polyester fabric or a nonwoven fabric to a uniform thickness, and the resultant is subjected to wet coagulation in water, whereby a porous support membrane having micropores with a diameter of a few tens of nm or less at most of the surface can be obtained.

The thickness of the above-described porous support membrane affects the strength of the semipermeable membrane and the packing density in an element using the same. For obtaining sufficient mechanical strength and packing density, the thickness of the porous support membrane is preferably in the range of 50 to 300 µm, and more preferably in the range of 75 to 200 µm. The thickness of a base material that reinforces the porous support membrane is preferably in the range of 10 to 200 µm, and more preferably in the range of 30 to 100 µm.

The form of the porous support membrane can be observed with a scanning electron microscope, a transmission electron microscope, or an atomic force microscope. For example, in the case of observation with a scanning electron microscope, the cast resin is peeled off from a base material, and then this is cut by freeze fracture technique to prepare a sample for cross-sectional observation. The sample is thinly coated with platinum, platinum-palladium, or ruthenium tetrachloride, preferably with ruthenium tetrachloride, and observed with an ultra-high resolution field-emission scanning electron microscope (UHR-FE-SEM) at an accelerating voltage of 3 to 6 kV. As an ultra-high resolution field-emission scanning electron microscope, for example, S-900 type electron microscope manufactured by Hitachi Ltd. can be used. The membrane thickness and surface pore size of the porous support membrane are determined from the electron micrographs obtained. The thickness and the pore size in the present invention refer to the mean values.

To carry out interfacial polycondensation on the porous support membrane, the above-described aqueous polyfunctional amine solution is first contacted with the porous support membrane. This contact is preferably carried out uniformly and continuously on the surface of the porous support membrane. Specifically, examples of the method include coating the porous support membrane with the aqueous polyfunctional amine solution and immersing the porous support membrane in the aqueous polyfunctional amine solution. The contact time between the porous support membrane and the aqueous polyfunctional amine solution is preferably in the range of 1 to 10 minutes, and more preferably in the range of 1 to 3 minutes.

After the aqueous polyfunctional amine solution has been contacted with the porous support membrane, it is preferable to drain the solution sufficiently so that droplets would not remain on the membrane. The membrane would be less prone to degradation in performance because there would remain no droplets responsible for membrane defects after membrane formation. Examples of the method of draining the solution that can be used include, for example, holding vertically the porous support membrane after being contacted with the aqueous polyfunctional amine solution to subject the excess aqueous solution to gravity flow and blowing air such as nitrogen from an air nozzle to compulsorily drain the solution, as described in JP 02-78428 A. After the draining, the membrane surface can also be dried to remove a portion of the water of the aqueous solution.

Next, the porous support membrane after being contacted with the aqueous polyfunctional amine solution is contacted with an organic solvent solution containing polyfunctional acid halides to form the skeleton of a cross-linked separating functional polyamide layer by interfacial polycondensation.

The concentration of polyfunctional acid halides in the organic solvent solution is preferably in the range of 0.01 to 10% by weight, and more preferably in the range of 0.02 to 2.0% by weight. In this range, the progress of the reaction will not be slow, and side reactions are unlikely to occur. Further, it is more preferable to add an acylation catalyst such as N,N-dimethylformamide to this organic solvent solution because the interfacial polycondensation will be accelerated.

The organic solvent, preferably, is immiscible with water, dissolves polyfunctional acid halides, and does not break the porous support membrane. Such an organic solvent may be any solvent as long as it is inactive against polyfunctional amines and polyfunctional acid halides. Preferred examples include liquid hydrocarbons and halogenated hydrocarbons such as trichlorotrifluoroethane, and in view of being a substance that does not deplete the ozone layer, availability, handleability, safety in handling, and the like, octane, nonane, decane, undecane, dodecane, tridecane, tetradecane, heptadecane, hexadecane, cyclooctane, ethylcyclohexane, 1-octene, 1-decene, and the like, or mixtures thereof are preferably used.

The method of contacting the organic solvent solution of polyfunctional acid halides with the porous support membrane after being contacted with the aqueous polyfunctional amine solution may be carried out in the same manner as in the above-described method of coating the porous support membrane with an aqueous polyfunctional amine solution.

As described above, after carrying out interfacial polycondensation by means of contact with the organic solvent solution of polyfunctional acid halides to form a separating functional layer composed of cross-linked polyamide on the porous support membrane, it is preferable to drain the excess solvents. Examples of the method of draining the solvents that can be used include holding the membrane vertically to remove the excess organic solvent by gravity flow. In this case, the vertical holding time is preferably between 1 and 5 minutes, and more preferably between 1 and 3 minutes.

After the draining, drying is generally carried out. A preferred drying method is, for example, blowing air at a temperature of 10 to 80° C., particularly preferably 20 to 40° C., on the membrane at a wind speed on the membrane surface of 2 to 20 m/sec, particularly preferably 3 to 10 m/sec, as can be seen in JP 05-76740 A. Under the drying conditions in the range shown above, the membrane can be sufficiently dried, and at the same time performance degradation is unlikely to occur because shrinkage of the porous support membrane due to excessive evaporation of water does not occur.

Then, after the excess organic solvent solution of polyfunctional acid halides has been dried, the semipermeable membrane is contacted with a reagent containing nitrous acid and/or a salt thereof to modify the properties of the semipermeable membrane.

In general, nitrite generates nitrous acid ($HNO_2$) by reacting with hydrogen ions, and it efficiently generate nitrous acid at a temperature of about 20° C. and when the pH of an aqueous solution is 7 or lower, preferably 5 or lower, and more preferably 4 or lower. Above all, an aqueous solution of sodium nitrite obtained by the reaction with hydrochloric acid or sulfuric acid in an aqueous solution is particularly preferred in terms of convenience in handling.

In the present invention, the concentration of nitrous acid or nitrite in the reagent to be contacted with the membrane is preferably in the range of 0.01 to 1% by weight. When the concentration of nitrous acid or nitrite is in the range of 0.01% to 1% by weight, handling of the solution is easy, and a sufficient effect can be obtained. The solution temperature is preferably 15° C. or higher. In this concentration range and temperature range, a sufficient modification effect can be obtained.

The contact with a reagent containing nitrous acid and/or a salt thereof is preferably carried out uniformly and continuously on the semipermeable membrane surface. Specific examples include, for example, coating the semipermeable membrane with a nitrous acid solution and immersing the semipermeable membrane in a reagent containing nitrous acid and/or a salt thereof. The contact time between the semipermeable membrane and a reagent containing nitrous acid and/or a salt thereof is preferably the time during which a diazonium salt and/or derivatives thereof are generated; the treatment can be carried out in a short time at a high concentration, but it requires a long time at a low concentration. Therefore, in the case of a solution of the above-described concentration, the contact time is preferably in the range of 1 to 10 minutes, and more preferably in the range of 1 to 3 minutes.

The semipermeable membrane obtained by the present invention is characterized, for example, by the separating functional layer colored yellow to brown. This is probably because azo compounds are formed in the separating functional layer by the diazonium salt resulting from the reaction of primary amino groups with a reagent containing nitrous acid and/or a salt thereof The production method for achieving a yellow index of the separating functional layer of the above-described semipermeable membrane of 10 to 40 is not particularly limited, and, for example, achieving the state where polyfunctional amines remain after forming a separating functional layer on the porous support membrane and before contacting the separating functional layer with a reagent containing nitrous acid and/or a salt thereof, and/or contacting the separating functional layer with a reagent reactive with the diazonium salt resulting from the above-described reaction can be preferably employed.

Examples of the method of achieving the state where polyfunctional amines remain before contacting the separating functional layer with a reagent containing nitrous acid and/or a salt thereof include forming a separating functional layer on the porous support membrane, and then contacting the separating functional layer with a reagent containing nitrous acid and/or a salt thereof without washing the semipermeable membrane; and forming a separating functional layer on the porous support membrane, and then contacting the separating functional layer with the aqueous polyfunctional amine solution again.

By achieving the state where polyfunctional amines remain before contacting the separating functional layer with a reagent containing nitrous acid and/or a salt thereof, primary amino groups exist sufficiently in the separating functional layer, and therefore azo compounds are formed in the separating functional layer when the separating functional layer is contacted with a reagent containing nitrous acid and/or a salt thereof. It is preferred that the azo compounds have an increased molecular weight compared to that in the state of polyfunctional amine, have such a structure that is larger than the pore size of the separating functional layer, and be retained inside the separating functional layer. By retaining the azo compounds inside the separating functional layer, the effect of filling the void in the separating functional layer is obtained, whereby the solute removal rate is improved.

In the method of producing the semipermeable membrane of the present invention, to obtain the above-described effect, in the case where the polyfunctional amine is m-phenylenediamine when the separating functional layer is contacted again with an aqueous polyfunctional amine solution after forming a separating functional layer, the permeability coefficient of m-phenylenediamine is in the range of $5.0 \times 10^{-7}$ to $1.0 \times 10^{-7}$ cm/sec. The permeability coefficient of m-phenylenediamine can be determined by the following method.

As a transport equation for the reverse osmosis method based on nonequilibrium thermodynamics, the following equations are known.

$$Jv = Lp(\Delta P - \sigma \cdot \Delta \pi) \quad (1)$$

$$Js = P(Cm - Cp) + (1-\sigma)C \cdot Jv \quad (2)$$

wherein, Jv is a volumetric flux of membrane permeability ($m^3/m^2/sec$); Lp is a pure water permeability coefficient ($m^3/m^2/sec/Pa$); $\Delta P$ is a transmembrane pressure difference (Pa); σ is a solute reflection coefficient; An is a transmembrane osmotic pressure difference (Pa); Js is a solute membrane permeate flux ($mol/m^2/sec$); P is a solute permeability coefficient (m/sec); Cm is a solute membrane surface concentration ($mol/m^3$); Cp is a permeability concentration ($mol/m^3$); and C is a concentration of membrane on both sides ($mol/m^3$). C, average concentration of membrane on both sides, is substantially meaningless when the difference in concentration on both sides is very large as in the case of reverse osmosis membranes. Therefore, the following equation obtained by integrating Equation (2) with respect to membrane thickness is often used.

$$R = \sigma(1-F)/(1-\sigma F) \quad (3)$$

wherein F is defined by the following equation.

$$F = \exp\{-(1-\sigma)Jv/P\} \quad (4)$$

R is a true removal rate and defined by the following equation.

$$R = 1 - Cp/Cm \quad (5)$$

Lp can be calculated from Equation (1) by changing $\Delta P$ variously, and R is measured by changing Jv variously. P and a can be determined simultaneously by curve-fitting Equation (3) and Equation (4) to a plot of R versus 1/Jv.

When the permeability coefficient of m-phenylenediamine is in the above-described range, polyfunctional amines is able to permeate into the separating functional layer, and azo compounds formed in the separating functional layer can be retained. Therefore, when azo compounds formed in advance outside the system are contacted with the separating functional layer, the effect of improving the solute removal rate, an object of the present invention, cannot be obtained because the azo compounds do not permeate into the separating functional layer.

When the separating functional layer is contacted with a reagent containing nitrous acid and/or a salt thereof, it is preferred that, in the semipermeable membrane, polyfunctional amines remaining after cross-linked polyamide forming reaction and the amines separately added be retained in parts excluding the base material in the semipermeable membrane (the separating functional layer) in an amount in the range of 0.5% by weight to 2% by weight. In such a range, the yellow index of the separating functional layer of 10 to 40 can be achieved, and a semipermeable membrane achieving a balance between high water permeability and high solute removal properties can be obtained. Further, when the polyfunctional amines and the amines separately added are retained in parts excluding the base material in the semipermeable membrane in an amount in the range up to 2% by weight, preferably up to 1% by weight, it is preferable to contact the separating functional layer with the below-described solution that reacts with a diazonium salt and induces a diazo coupling reaction and also with a solution containing a reducing agent. When the amount of amines is less than 0.5% by weight, it is necessary to contact the separating functional layer with the above-described solution that reacts with a diazonium salt and induces a diazo coupling reaction and also with the solution containing a reducing agent. At this time, to achieve a yellow index of not less than 10, it is preferred that the amount of amines be retained preferably in the range of 0.001% by weight or more, and more preferably 0.01% by weight or more.

In the present invention, the amine content in parts excluding the base material in the semipermeable membrane is measured by the following procedure. The semipermeable membrane is cut into 10 x 10 cm, and a base material is peeled off to obtain a complex of a cast formation composed of a resin with a separating functional layer. This is immersed in 50 g of ethanol for 8 hours, and components extracted with ethanol are measured by chromatography and a mass spectrometer. As chromatography and a mass spectrometer, for example, Agilent 1100 Series available from Agilent Technologies and API 2000 available from Applied Biosystems can be used. Then, the complex of a cast formation composed of a resin with a separating functional layer is taken out from the ethanol, dried by heating at 120° C. for 2 hours, cooled to room temperature in a desiccator, and then weighed to calculate the amine content in the semipermeable membrane excluding the base material.

After the semipermeable membrane has been contacted with a reagent containing nitrous acid and/or a salt thereof, conversion of a part of the formed diazonium salt or derivatives thereof into phenol by contact with water can be preferably employed. In addition to water, reaction with a reagent reactive with a diazonium salt can variously modify the properties of the membrane. Examples of the reactive reagent used here include, for example, chloride ion, bromide ion, cyanide ion, iodide ion, fluoroboric acid, hypophosphorous acid, sodium bisulfite, sulfite ion, aromatic amine, hydrogen sulfide, and thiocyanic acid. Chloride ion, bromide ion, and cyanide ion preferably coexist with copper chloride because they do not have sufficiently high reactivity alone. For example, using a reducing agent such as hypophosphorous acid allows substitution of amino groups with hydrogen. Sodium bisulfite and sulfite ion are preferred. Upon reacting with sodium bisulfite, substitution reaction immediately occurs, and amino groups are substituted with sulfo groups. By controlling the reaction of the diazonium salt formed with water and with a reactive reagent, semipermeable membranes for the intended purpose can be prepared.

In the semipermeable membrane obtained by the above-described method, the solute removal properties and water permeability of the semipermeable membrane can be even more improved by adding, for example, the step of treating with warm water at a temperature in the range of 30 to 150° C., preferably in the range of 40 to 100° C., for 1 to 10 minutes, more preferably 2 to 8 minutes.

The yellow index and azo compound amount of the separating functional layer vary depending on the conditions for treating with a reagent containing nitrous acid and/or a salt thereof (concentration, pH, treating time, and temperature), and therefore the conditions for treating with a reagent containing nitrous acid and/or a salt thereof need to be changed as appropriate so as to be in the range of the present invention.

The method of incorporating azo groups into a separating functional polyamide layer in the method of producing the semipermeable membrane of the present invention is preferably subjecting the composite semipermeable membrane produced by the above-mentioned method to a modification process.

Although the composite semipermeable membrane obtained by the above-mentioned method may be subjected as obtained to the subsequent modification process, it is preferable to remove unreacted residue before the modification process, for example, by washing with water. It is preferable to remove remaining amino compounds by washing the composite semipermeable membrane with water within the range of 30 to 100° C. The washing can be performed by immersing the composite semipermeable membrane in the water within the above-described temperature range or spraying water. When the temperature of the water used is in the above-described range, the permeate flow rate will not be low because amino compounds do not remain in the composite semipermeable membrane, while the permeate flow rate will not be low because the heat shrink of the composite semipermeable membrane will not occur. Further, it is preferable to thereafter perform various post-treatments.

The modification process in the method of producing the semipermeable membrane of the present invention, the process being for the purpose of incorporating azo groups into a separating functional polyamide layer and achieving the ratio of the number of azo groups to the number of benzene rings in the separating functional polyamide layer within the range of 0.01 to 0.1, will now be described. This modification process is preferably, but not limited to, a process of carrying out, as an essential process, the modification process A for contacting the composite semipermeable membrane produced by the above-mentioned method with a solution containing a compound that reacts with amino groups in the separating functional polyamide layer and forms a diazonium salt or derivatives thereof, and then further carrying out the modification process B for contacting with a solution that reacts with a diazonium salt and induces a diazo coupling reaction and the modification process C for contacting with a solution containing a reducing agent. The modification process B and the modification process C may be carried out in such a manner that either one of the processes is carried out first, and then the other, or the two processes may be carried out simultaneously.

In the modification process A, amino groups in the separating functional polyamide layer react with nitrous acid and a salt thereof, a nitrosyl compound, and the like to form a diazonium salt or derivatives thereof. In the modification process B, diazo coupling reaction occurs with the diazonium salt formed in the modification process A, resulting in the introduction of azo groups into the separating functional polyamide layer. Further, a reducing agent is used in the modification process C to inactivate the compound such as nitrous acid that reacts with amino groups and forms a diazonium salt or derivatives thereof, which compound has been used in the modification process A, thereby allowing reduction of the amount of low-molecular-weight azo compounds at the polyamide terminus. Alternatively, a modification process using a mixed solution of a compound that reacts with a diazonium salt and induces a diazo coupling reaction with a reducing agent (modification processes B+C) may be performed, or after inactivating the compound such as nitrous acid that reacts with amino groups on the composite semipermeable membrane and forms a diazonium salt or derivatives thereof by the above-described modification process C in advance, the diazonium salt formed may be reacted with the solution containing a compound that induces a diazo coupling reaction in the subsequent modification process B.

In the modification process A, the modification process B, and the modification process C, the method of contacting the composite semipermeable membrane with a solution containing a compound that forms a diazonium salt or derivatives thereof, a solution containing a compound that reacts with a diazonium salt and induces a diazonium coupling reaction, and a solution containing a reducing agent may be, for example, but not limited to, immersion of the whole composite semipermeable membrane in the compound solution or spraying of the compound solution on the composite semipermeable membrane, and any method can be used as long as the separating functional layer of the composite semipermeable membrane and the compound are brought into contact.

Examples of the compound in the modification process A that reacts with amino groups and forms a diazonium salt or derivatives thereof include, for example, nitrous acid and a salt thereof, and a nitrosyl compound, and an aqueous solution thereof is preferred when used in the present invention. Since the aqueous solution of nitrous acid and a nitrosyl compound readily generate gas and decompose, it is preferable to sequentially generate nitrous acid by the reaction, for example, of nitrite with an acidic solution. In general, nitrite generates nitrous acid ($HNO_2$) by reacting with hydrogen ions, and it efficiently generate nitrous acid at 20° C. and when the pH of an aqueous solution is 7 or lower, preferably 5 or lower, and more preferably 4 or lower. Above all, an aqueous solution of sodium nitrite obtained by the reaction with hydrochloric acid or sulfuric acid in an aqueous solution is particularly preferred in terms of convenience in handling.

In the modification process A, the concentration of nitrous acid or nitrite in the above-described compound solution that reacts with amino groups and forms a diazonium salt or derivatives thereof is preferably in the range of 0.01 to 1% by weight at 20° C. In this range, sufficient diazonium salts or derivatives thereof are formed, and at the same time handling of nitrous acid and a nitrite solution is easy because the concentration is appropriate.

The treatment temperature in the modification process A is preferably 15° C. to 45° C. Within this range, the reaction will not take too much time, and at the same time the handling is easy because the decomposition rate of nitrous acid is also appropriate.

The contact time with the composite semipermeable membrane in the modification process A is preferably the time enough to generate a diazonium salt; in general, the treatment can be carried out in a short time at a high concentration, but it requires a long time at a low concentration. A short-time treatment at a high concentration is preferred because if a diazonium salt is generated at a low concentration over a long time, the diazonium salt reacts with water before reaction with a compound reactive with the diazonium salt. For example, in the case of a nitrous acid solution of 2000 mg/L, the contact time is preferably from 30 seconds to 10 minutes.

In the modification process B, the semipermeable membrane is contacted with a solution containing a compound that reacts with a diazonium salt and induces a diazo coupling reaction. Examples of the compound that reacts with a diazonium salt and induces a diazo coupling reaction include, but are not limited to, resorcin, phloroglucinol, naringenin, pyrogallol, quercetin, hydroquinone, pyrocatechol, acetanilide, m-phenylenediamine, p-phenylenediamine, 1,3,5-triaminobenzene, and the like. Among them, in particular, m-phenylenediamine, 1,3,5-triaminobenzene, and phloroglucinol can be preferably used in terms of solubility in water and reactivity. A solution for contacting the semipermeable membrane is preferably an aqueous solution thereof.

In the modification process B, it is preferred that, in a solution containing a compound that reacts with a diazonium salt and induces a diazo coupling reaction, the concentration of the compound be preferably in the range of 0.0005 to 0.05% by weight. The solution temperature is preferably 15° C. or higher. In this concentration range and temperature range, a sufficient diazo coupling reaction occurs, and at the same time a sufficient permeate water volume can be obtained.

The temperature of the solution containing a compound that reacts with a diazonium salt and induces a diazo coupling reaction is preferably 15° C. to 50° C. Within this temperature range, the reaction will not take too much time, and at the same time diazo coupling reaction proceeds sufficiently because the decomposition rate of the diazonium salt formed in the modification process A is appropriate. Further, in this modification process B, it is preferable to contact the semipermeable membrane with the above-described solution for 30 seconds or more in order that the diazo coupling reaction proceeds sufficiently.

Preferred examples of the reducing agent in the modification process C include, but are not limited to, solutions containing sodium bisulfite, sulfite ion, sulfamic acid, urea, and ammonium chloride. A solution for contacting with the semipermeable membrane is preferably an aqueous solution thereof.

In the modification process C, the reducing agent concentration in a solution containing a reducing agent is preferably 0.01% by weight or more. The solution temperature is preferably 15° C. or more. In this concentration range and temperature range, a sufficient modification effect can be obtained. Further, for sufficient reduction reaction, it is preferable to contact the semipermeable membrane with the above-described solution for 30 seconds or more.

By controlling the reaction in the modification process B and the modification process C after performing the modification process A, the compound that reacts with amino groups and forms a diazonium salt or derivatives thereof, such as nitrous acid remaining in the separating functional polyamide layer, is inactivated, and only the diazonium salt undergoes a diazo coupling reaction, whereby the composite semipermeable membrane of the preferred embodiment in the present invention, having azo groups in the separating functional polyamide layer, wherein the ratio of the number of azo groups to the number of benzene rings is in the range of 0.01 to 0.1, and the content of azo compounds in parts excluding the base material in the composite semipermeable membrane is less than 0.05% by weight, can be easily obtained.

The semipermeable membrane of the present invention thus produced is wound, together with a feed spacer such as a plastic net, a permeate spacer such as a tricot, and, if necessary, a film for enhancing pressure resistance, around a cylindrical water-collecting pipe provided with a large number of pores by drilling and processed into a spiral semipermeable membrane element for suitable use. Further, the elements can be connected in series or in parallel and housed in a pressure container to provide a semipermeable membrane module.

Further, the above-described semipermeable membrane, and the element and the module thereof can be combined, for example, with a pump for feeding feed water thereto and with an apparatus for pretreating the feed water to constitute a fluid separation apparatus. By using this separation apparatus, permeate water such as drinking water and concentrated water that has not permeated through the membrane can be isolated from feed water to obtain the water for the intended purpose.

Considering the fact that the higher the operating pressure of the fluid separation apparatus, the more the energy required for operation increases although the more desalination rate improves, and the durability of the semipermeable membrane, the operating pressure during passing the water to be treated through the semipermeable membrane is preferably 1 MPa to 10 MPa under sea water desalination conditions. It is preferably 0.3 MPa to 5 MPa under brackish water desalination conditions. The temperature of feed water is preferably 5° C. to 45° C., because the higher it is, the more the desalination rate decreases, but the lower it is, the more the membrane permeate flux decreases as well. When the pH of feed water is high, scale of magnesium and the like can occur in the case of the feed water of high salt concentration such as sea water, and when it is low, there is a concern about membrane degradation. Thus, the operation in the neutral range is preferred.

EXAMPLES

The present invention will now be described by way of examples, but the present invention is not limited to these examples. The measurements in Examples and Comparative Example were made as described below.

(Desalination Rate)

The salt concentration of permeate water was measured when the sea water adjusted to a temperature of 25° C. and a pH of 6.5 (TDS concentration; 3.5%, boron concentration; about 5 ppm) was fed at an operating pressure of 5.5 MPa to a semipermeable membrane to thereby make a determination from the following equation.

Desalination rate=100×1−(salt concentration in permeate water/salt concentration in feed water))

(Membrane Permeate Flux)

Sea water was used as feed water to determine the membrane permeate flux ($m^3/m^2$/day) from permeate water volume (cubic meter) per square meter of membrane surface per day.

(Boron Removal Rate)

The boron concentration in feed water and in permeate water was analyzed by an ICP emission spectrometer to make a determination from the following equation.

Boron removal rate=100×{1−(boron concentration in permeate water/boron concentration in feed water)}

(Yellow Index of Separating Functional Layer)

The semipermeable membrane whose base material has been peeled off was placed on a glass plate with the separating functional layer surface down, and then the porous support membrane was dissolved and removed with dichloromethane. The separating functional layer sample remaining on the glass plate was subjected to a transmission measurement using a color meter to determine the yellow index.

(Polyfunctional amine content in parts excluding base material in semipermeable membrane)

A semipermeable membrane was cut into 10×10 cm, and a base material was peeled off to obtain a complex of a cast formation composed of polysulfone with a separating functional layer. This is immersed in 50 g of ethanol for 8 hours, and the components extracted with ethanol were measured by chromatography and a mass spectroscope. Then, the complex of a cast formation composed of polysulfone with a separating functional layer was taken out from the ethanol, dried by heating at 120° C. for 2 hours, cooled to room temperature in a desiccator, and then weighed to determine the polyfunctional amine content in parts excluding the base material in the semipermeable membrane from the equation below.

Polyfunctional amine content in parts excluding base material in semipermeable membrane=100×(polyfunctional amine weight/dried membrane weight)

(Azo Compound Content in Parts Excluding Base Material Semipermeable Membrane)

A semipermeable membrane was cut into 10×10 cm, and a base material was peeled off to obtain a complex of a cast formation composed of polysulfone with a separating functional layer. This is immersed in 50 g of ethanol for 8 hours, and the components extracted with ethanol were analyzed using an UltraViolet-Vis-Near InfraRed spectrophotometer. Then, the complex of a cast formation composed of polysulfone with a separating functional layer was taken out from the ethanol, dried by heating at 120° C. for 2 hours, cooled to room temperature in a desiccator, and then weighed. The azo compound content in parts excluding the base material in the semipermeable membrane was determined by the equation below from the absorbance of the components extracted with ethanol at 450 nm, the calibration curve of the absorbance of chrysoidine, a reference material, at a wavelength of 450 nm, and the dried membrane weight.

Azo compound content in parts excluding base material in semipermeable membrane=100×(azo compound weight in terms of chrysoidine/dried membrane weight)

In Examples, to carry out relative evaluation of the performances of these membranes, the permeate flow ratio and the removal rate ratio were used to carry out performance comparison. Specifically, the permeate flow ratio and the removal rate ratio were determined by the following equation.

Permeate flow ratio=permeate flow rate in each Example and each Comparative Example/permeate flow rate in Reference Examples Removal rate ratio =(100 - removal rate in Examples and each Comparative Example)/(100−removal rate in Reference Examples)

The permeate flow ratio is a change, expressed as a ratio, in permeate flow rate when an untreated composite semipermeable membrane is subjected to various treatments, and when the permeate flow ratio is 1 or more, it means that the permeate flow rate has been increased. The removal rate ratio is a change, expressed as a ratio, in removal rate when an untreated composite semipermeable membrane is subjected to various treatments, and when the removal rate ratio is 1 or less, it means that the removal rate has been increased.
(Ratio of the Number of Azo Groups to the Number of Benzene Rings)

A composite semipermeable membrane was cut into 900 $cm^2$, and a portion of the support, a base material (taffeta or nonwoven fabric made of polyester fibers), is peeled off. This is dissolved in 2 L of methylene chloride, and then filtration is carried out to obtain a separating functional polyamide layer. The separating functional polyamide layer is dried and then collected in a hermetically-sealed container to make a measurement with a solid-state NMR instrument (CMX-300 manufactured by Chemagnetics) under the following conditions.

Measurement Atmosphere: dry air
Temperature: room temperature (~22° C.)
Chemical Shift Reference: Si rubber (internal standard: 1.56 ppm)
Observation Frequency: 13C: 75.4976 MHz
Probe: φ7.5 mm probe for CP/MAS
Observation Width: 30.03 kHz
Pulse Width: 90° pulse: 4.5 μs
Pulse Repetition Time: ACQTM=0.0341 sec, PD=5 s (CP/MAS), 300 s (DD/MAS)
Pulse Mode: CP/MAS method, DD/MAS method
Contact Time: 2 ms
Sample Rotational Speed: 6 kHz
Data point: POINT=8192, SAMPO=1024

For a polyamide functional layer, 1024 points are retrieved as measurement data and zero-filled to 8192 points for Fourier transformation. For each peak of the spectrum after Fourier transformation, optimization calculation is performed by the nonlinear least-squares method using as variable parameters the center position, height, and half bandwidth of the peak shape created using a Lorentzian waveform, a Gaussian waveform, or a combination of both.

According to the above-described method, the ratio of the number of azo groups to the number of benzene rings was calculated from the chemical shift value of the carbon adjacent to an azo group (about 152 ppm).

(Reference Example A)

On a nonwoven fabric made of polyester fibers (air permeability: 0.5 to 1 $cc/cm^2/sec$), a solution of polysulfone in 15.0% by weight in dimethylformamide (DMF) was cast at a thickness of 180 μm at room temperature (25° C.), and the resultant was immediately immersed in pure water and left to stand for 5 minutes to produce a porous support membrane (thickness: 150 to 160 μm) composed of a fiber-reinforced polysulfone support membrane.

The porous support membrane thus obtained was immersed for 2 minutes in an aqueous polyfunctional amine solution prepared such that the total polyfunctional amines were 3.5% by weight and that m-phenylenediamine/1,3,5-triaminobenzene=70/30 (molar ratio), and the support membrane was slowly pulled up in the vertical direction. Nitrogen was blown thereto from an air nozzle to remove the excess aqueous solution from the support membrane surface. Thereafter, an n-decane solution containing 0.15% by weight of trimesic acid chloride was applied thereto such that the whole surface was wet, and the support membrane was left to stand for 1 minute. Then, to remove the excess solution from the membrane, the membrane was held upright for 2 minutes for draining and dried by blowing air at 20° C. using an air blower.

The yellow index of the separating functional layer of the semipermeable membrane was 6.3, and no azo compound was detected in parts excluding the base material in the semipermeable membrane. The membrane performance evaluation of the semipermeable membrane revealed that the salt removal rate was 99.55%; the membrane permeate flux was 0.71 $m^3/m^2/day$; and the boron removal rate was 90.8%.

(Reference Example B)

A fabric-reinforced polysulfone support membrane (ultrafiltration membrane) which is a porous support membrane was produced by the following method. Specifically, a wet nonwoven fabric that is made of a mixed fiber of polyester fibers with a single yarn fineness of 0.5 decitex and of 1.5 decitex and has an air permeability of 0.7 $cm^3/cm^2/sec$, an average pore size of 7 μm or less, and a size of 30 cm long and 20 cm wide was fixed onto a glass plate, and a solution (2.5 poise: 20° C.) having a polysulfone concentration of 15% by weight with dimethylformamide (DMF) solvent was cast thereon to a total thickness of 200 μm. The resultant was immediately immersed in water to obtain a porous support membrane of polysulfone.

Next, this polysulfone porous support membrane was immersed in 6.5% by weight of m-phenylenediamine for 10 seconds, and then a solution obtained by dissolving 0.165% by weight of trimesic acid chloride in decane was applied thereto at a rate of 160 ml/m². Then, the membrane was made upright to drain and remove the excess solution, and then, in order to evaporate the solvent remained on the membrane surface, air at a temperature of 25° C. was blown thereon for 1 minute in such a manner that the wind speed on the membrane surface was 8 m/sec, after which the remaining acid halide groups were hydrolyzed with a 1% aqueous $Na_2CO_3$ solution. Thereafter, the membrane was immersed in hot water at 90° C. for 2 minutes to obtain a composite semipermeable. The composite semipermeable membrane obtained had a permeate flow rate of 0.74 $m^3/m^2$/day and a boron removal rate of 92%, and the ratio of the number of azo groups to the number of benzene rings and the content of azo compounds were both 0.

Examples 1 and 2 to 12, Comparative Examples 1 and 2

The semipermeable membrane obtained in Reference Example A was treated at room temperature (20° C.) with 0.2% by weight of an aqueous sodium nitrite solution whose pH was adjusted to 3 with sulfuric acid. The concentration of the nitrous acid that undergoes forming reaction can be determined as a conversion of the nitrite present into nitrous acid. The treating time was 1 minute. The semipermeable membrane was taken out of the nitrous acid solution and then immersed in water at 20° C. for 2 minutes, resulting in that the semipermeable membrane turned brown from white.

The yellow index of the separating functional layer of the semipermeable membrane was 14.8, and the azo compound content in parts excluding the base material in the semipermeable membrane was 0.065% by weight. The membrane performance evaluation of the semipermeable membrane revealed that the salt removal rate was 99.85%; the membrane permeate flux was 0.92 $m^3/m^2$/day; and the boron removal rate was 93.8%, showing that the solute removal rate and the membrane permeate flux were both improved (Example 1).

Further, semipermeable membranes were obtained at various sodium nitrite concentrations, treating times, pHs, m-phenylenediamine contents before nitrous acid treatment in parts excluding the base material in the semipermeable membrane, yellow indices of the separating functional layer, azo compound contents after nitrous acid treatment in parts excluding the base material in the semipermeable membrane, and warm water treatment temperatures after nitrous acid treatment (Examples 2 to 12, Comparative Examples 1 and 2). The performances of these membranes are shown together in Table 1.

TABLE 1

| | Modification process A | | | Amine content (wt %) | Yellow index of separating functional | Ratio of the number of azo groups to the number of benzene rings | Azo compound content (wt %) |
| | $NaNO_2$ (wt %) | pH | Treating time (min) | | | | |
| --- | --- | --- | --- | --- | --- | --- | --- |
| Reference Example A | — | — | — | 0.56 | 6.3 | undetectable | undetectable |
| Example 1 | 0.2 | 3 | 1 | 0.56 | 14.8 | 0.04 | 0.065 |
| Example 2 | 0.2 | 3 | 1 | 1.51 | 23.4 | 0.07 | 0.303 |
| Example 3 | 0.2 | 3 | 1 | 1.95 | 32.7 | 0.08 | 0.351 |
| Example 4 | 0.2 | 2 | 1 | 1.51 | 20.6 | 0.07 | 0.259 |
| Example 5 | 0.05 | 3 | 1 | 1.51 | 17.0 | 0.06 | 0.162 |
| Example 6 | 2 | 3 | 1 | 1.51 | 20.8 | 0.07 | 0.265 |
| Example 7 | 0.2 | 3 | 0.5 | 1.51 | 21.8 | 0.08 | 0.297 |
| Example 8 | 0.2 | 3 | 5 | 1.51 | 21.4 | 0.08 | 0.303 |
| Example 9 | 0.2 | 3 | 20 | 1.51 | 19.9 | 0.07 | 0.238 |
| Example 10 | 0.2 | 3 | 1 | 1.51 | 23.0 | 0.07 | 0.299 |
| Example 11 | 0.2 | 3 | 1 | 1.51 | 20.5 | 0.06 | 0.268 |
| Example 12 | 0.2 | 3 | 1 | 1.51 | 16.7 | 0.06 | 0.204 |
| Example 13 | 0.2 | 3 | 1 | 0.56 | 15.1 | 0.05 | 0.081 |
| Comparative Example 1 | 0.2 | 3 | 1 | 0.21 | 8.2 | 0.02 | 0.032 |
| Comparative Example 2 | 0.2 | 3 | 1 | 2.51 | 43.5 | 0.16 | 0.578 |
| Comparative Example 3 | — | — | — | 0.56 | 9.0 | 0.01 | 0.038 |
| Comparative Example 4 | — | — | — | 0.56 | 7.2 | 0.007 | undetectable |

TABLE 1-continued

|  | Warm water treatment temperature (° C.) | Desalination rate (%) | Membrane permeate flux (m³/m²/day) | Boron removal rate (%) | Removal rate ratio | Permeate flow ratio |
|---|---|---|---|---|---|---|
| Reference Example A | 20 | 99.55 | 0.71 | 90.8 | — | — |
| Example 1 | 20 | 99.85 | 0.92 | 93.8 | 0.67 | 1.30 |
| Example 2 | 20 | 99.89 | 0.89 | 94.4 | 0.61 | 1.25 |
| Example 3 | 20 | 99.88 | 0.76 | 94.6 | 0.59 | 1.07 |
| Example 4 | 20 | 99.81 | 1.01 | 92.6 | 0.80 | 1.42 |
| Example 5 | 20 | 99.72 | 0.76 | 92.8 | 0.78 | 1.07 |
| Example 6 | 20 | 99.85 | 0.99 | 93.3 | 0.73 | 1.39 |
| Example 7 | 20 | 99.79 | 0.84 | 94.4 | 0.61 | 1.18 |
| Example 8 | 20 | 99.80 | 1.04 | 91.8 | 0.89 | 1.46 |
| Example 9 | 20 | 99.76 | 1.13 | 91.0 | 0.98 | 1.59 |
| Example 10 | 30 | 99.87 | 0.88 | 94.2 | 0.63 | 1.24 |
| Example 11 | 50 | 99.88 | 0.93 | 94.7 | 0.58 | 1.31 |
| Example 12 | 95 | 99.80 | 1.04 | 93.3 | 0.73 | 1.46 |
| Example 13 | 20 | 99.85 | 0.83 | 94.7 | 0.58 | 1.17 |
| Comparative Example 1 | 20 | 99.75 | 1.21 | 86.4 | 1.48 | 1.70 |
| Comparative Example 2 | 20 | 99.88 | 0.65 | 94.2 | 0.63 | 0.92 |
| Comparative Example 3 | 20 | 99.60 | 0.70 | 90.7 | 1.01 | 1.99 |
| Comparative Example 4 | 20 | 99.80 | 0.98 | 89.2 | 1.17 | 1.38 |

From the results of Examples 1 to 3 and Comparative Examples 1 and 2, it can be seen that when the yellow index of the separating functional layer is below 10, the boron removal rate cannot be improved; when above 40, the membrane permeate flux decreases, and therefore the treatment is ineffective. Further, it can be seen that also when the yellow index is below 10 and the azo compound content in parts excluding the base material in the semipermeable membrane after nitrous acid treatment is below 0.05% by weight or above 0.5% by weight, the membrane performance degrades similarly, and therefore the treatment is ineffective.

From the results of Examples 2 and 4, it can be seen that when the pH of a nitrous acid solution is lowered, although the membrane permeate flux is further improved, the effect of improving boron removal rate decreases.

From the results of Examples 2, 5, and 6, it can be seen that when the concentration of a nitrous acid solution is lower than 0.2% by weight or higher than 1% by weight, although the membrane performance can be improved, the effect is low.

From the results of Examples 2 and 7 to 9, it can be seen that when the nitrous acid treatment time is shorter than 1 minute or longer than 3 minutes, although the membrane performance can be improved, the effect is low.

From the results of Examples 2 and 10 to 12, it can be seen that also when the warm water treatment temperature after nitrous acid treatment is increased, the membrane performance is improved.

Example 13

The semipermeable membrane obtained in Reference Example A was treated at room temperature (20° C.) for 1 minute with 0.2% by weight of an aqueous sodium nitrite solution whose pH was adjusted to 3 with sulfuric acid. The semipermeable membrane was taken out of the nitrous acid solution, immersed in 0.1% by weight of an aqueous sodium sulfite solution, and then stored at room temperature, resulting in that the semipermeable membrane turned brown from white. The yellow index of the separating functional layer of the semipermeable membrane was 15.1, and the azo compound content in parts excluding the base material in the semipermeable membrane was 0.081% by weight. The membrane performance evaluation of the semipermeable membrane revealed that the salt removal rate was 99.85%; the membrane permeate flux was 0.83 m³/m²/day; and the boron removal rate was 94.7%, showing that the solute removal rate and the membrane permeate flux were both improved.

Comparative Example 3

The semipermeable membrane obtained in Reference Example A was immersed in 0.1% by weight of a chrysoidine solution (azo dye) for 2 minutes. The yellow index of the separating functional layer of the semipermeable membrane was 9.0, and the azo compound content in parts excluding the base material in the semipermeable membrane after nitrous acid treatment was 0.038% by weight. The membrane performance evaluation of the semipermeable membrane revealed that the salt removal rate was 99.60%; the membrane permeate flux was 0.70 m³/m²/day; and the boron removal rate was 90.7%, which were substantially the same as under conditions where the membrane was not immersed in a chrysoidine solution (Reference Example A).

Comparative Example 4

The semipermeable membrane obtained in Reference Example A was treated at room temperature (20° C.) with 0.02% by weight of an aqueous sodium hypochlorite solution whose pH was adjusted to 7. The treating time was 1 minute, and the semipermeable membrane was taken out of the aqueous sodium hypochlorite solution and then washed with water. The yellow index of the separating functional layer of the semipermeable membrane was 7.2, and no azo compound was detected in the separating functional layer. The membrane performance evaluation of the semipermeable membrane revealed that the salt removal rate was 99.80%; the membrane permeate flux was 0.98 m³/m²/day; and the boron removal rate was 89.2%.

Example 14

The composite semipermeable membrane of Reference Example B was immersed at 35° C. for 45 seconds in 2750 mg/L of an aqueous sodium nitrite solution whose pH was adjusted to 3 with sulfuric acid (the modification process A). The membrane performance, the ratio of the number of azo groups to the number of benzene rings, and the content of azo compounds after the subsequent immersion for 2 minutes in a mixed solution of 0.001% by weight of m-phenylenediamine and 0.1% by weight of sodium sulfite (the modification processes B+C) are shown in Table 2, and the removal rate ratio and permeate water volume ratio of the membrane performance after immersion for 5 days in 1.0% by weight of an aqueous hydrogen peroxide solution to the membrane performance before immersion in an aqueous hydrogen peroxide solution are shown in Table 3.

Example 15

A composite semipermeable membrane was prepared in the same manner as in Example 14 except that the concentration of m-phenylenediamine was 0.002% by weight in the modification processes (B+C). The membrane performance, the ratio of the number of azo groups to the number of benzene rings, and the content of azo compounds are shown in Table 2.

Example 16

A composite semipermeable membrane was prepared in the same manner as in Example 14 except that the concentration of m-phenylenediamine was 0.01% by weight in the modification processes (B+C). The membrane performance, the ratio of the number of azo groups to the number of benzene rings, and the content of azo compounds are shown in Table 2.

Comparative Example 5

For the composite semipermeable membrane of Reference Example 14, the membrane performance, the ratio of the number of azo groups to the number of benzene rings, and the content of azo compounds after immersion in 0.1% by weight of a chrysoidine aqueous solution for 1 hour are shown in Table 2.

Comparative Example 6

The composite semipermeable membrane of Reference Example 14 was immersed at 35° C. for 45 seconds in 2750 mg/L of an aqueous sodium nitrite solution whose pH was adjusted to 3 with sulfuric acid (the modification process A). The membrane performance, the ratio of the number of azo groups to the number of benzene rings, and the content of azo compounds after the subsequent immersion for 2 minutes in 0.1% by weight of a mixed solution of sodium sulfite (the modification process C) are shown in Table 2.

Comparative Example 7

A composite semipermeable membrane was prepared in the same manner as in Example 14 except that the concentration of m-phenylenediamines in the modification processes (B+C) was 0.0002% by weight. The membrane performance, the ratio of the number of azo groups to the number of benzene rings, and the content of azo compounds are shown in Table 2.

Comparative Example 8

A composite semipermeable membrane was prepared in the same manner as in Example 14 except that the concentration of m-phenylenediamines in the modification processes (B+C) was 0.05% by weight. The membrane performance, the ratio of the number of azo groups to the number of benzene rings, and the content of azo compounds are shown in Table 2, and the removal rate ratio and permeate water volume ratio of the membrane performance after immersion for 5 days in 1.0% by weight of an aqueous hydrogen peroxide solution to the membrane performance before immersion in an aqueous hydrogen peroxide solution are shown in Table 3.

Comparative Example 9

A composite semipermeable membrane was prepared in the same manner as in Example 14 except that the concentration of m-phenylenediamines in the modification processes (B+C) was 0.1% by weight. The membrane performance, the ratio of the number of azo groups to the number of benzene rings, and the content of azo compounds are shown together in Table 2.

TABLE 2

| | Modification process A | | | Amine content (wt %) | Yellow index of separating functional | Ratio of the number of azo groups to the number of benzene rings | Azo compound content (wt %) |
|---|---|---|---|---|---|---|---|
| | NaNO₂ (wt %) | pH | Treating time (min) | | | | |
| Reference Example B | — | — | — | 0.23 | 5.2 | — | — |
| Example 14 | 0.275 | 3 | 0.75 | 0.23 | 12.6 | 0.02 | 0.018 |
| Example 15 | 0.275 | 3 | 0.75 | 0.23 | 15.5 | 0.03 | 0.031 |
| Example 16 | 0.275 | 3 | 0.75 | 0.23 | 17.3 | 0.06 | 0.045 |
| Comparative Example 5 | — | — | — | 0.23 | 42.8 | 0.03 | 0.219 |
| Comparative Example 6 | 0.275 | 3 | 0.75 | 0.23 | 7.3 | 0.002 | 0.008 |
| Comparative Example 7 | 0.275 | 3 | 0.75 | 0.23 | 9.3 | 0.005 | 0.014 |

TABLE 2-continued

| | | | | | | | |
|---|---|---|---|---|---|---|---|
| Comparative Example 8 | 0.275 | 3 | 0.75 | 0.23 | 40.9 | 0.05 | 0.108 |
| Comparative Example 9 | 0.275 | 3 | 0.75 | 0.23 | 43.9 | 0.12 | 0.198 |

| | Warm water treatment temperature (° C.) | Desalination rate (%) | Membrane permeate flux ($m^3/m^2/day$) | Boron removal rate (%) | Removal rate ratio | Permeate flow ratio |
|---|---|---|---|---|---|---|
| Reference Example B | 20 | 99.67 | 0.74 | 92.0 | — | — |
| Example 14 | 20 | 99.86 | 0.91 | 94.5 | 0.69 | 1.23 |
| Example 15 | 20 | 99.86 | 0.84 | 94.8 | 0.65 | 1.14 |
| Example 16 | 20 | 99.86 | 0.75 | 95.8 | 0.53 | 1.01 |
| Comparative Example 5 | 20 | 99.65 | 0.70 | 91.8 | 1.03 | 0.95 |
| Comparative Example 6 | 20 | 99.83 | 1.06 | 90.5 | 1.19 | 1.43 |
| Comparative Example 7 | 20 | 99.85 | 1.03 | 90.9 | 1.14 | 1.39 |
| Comparative Example 8 | 20 | 99.87 | 0.61 | 95.9 | 0.51 | 0.82 |
| Comparative Example 9 | 20 | 99.88 | 0.31 | 96.9 | 0.39 | 0.42 |

TABLE 3

| Immersion for 5 days in aqueous hydrogen peroxide solution | Ratio of the number of azo groups to the number of benzene rings | Azo compound content (wt %) | Boron removal rate (%) | Membrane permeate flux ($m^3/m^2/day$) | Removal rate ratio compared to initial value | Permeate flow ratio compared to initial value |
|---|---|---|---|---|---|---|
| Example 14 | 0.02 | 0.018 | 92.5 | 0.99 | 1.36 | 1.09 |
| Comparative Example 8 | 0.05 | 0.108 | 93.0 | 0.68 | 1.71 | 1.11 |

As can be seen from Table 2, in Comparative Example 5, Comparative Example 6, Comparative Example 7, and Comparative Example 9, wherein the ratio of the number of azo groups to the number of benzene rings in the separating functional polyamide layer is less than 0.01 or more than 0.1, it is difficult to simultaneously achieve a high permeate flow rate and high neutral molecule removal properties. On the other hand, it can be seen that, in Example 14, Example 15, and Example 16, particularly in Example 14 and Example 15, wherein the ratio of the number of azo groups to the number of benzene rings in the separating functional polyamide layer is in the range of 0.01 to 0.05, a high permeate flow rate and high neutral molecule removal properties was simultaneously achieved.

It can be seen that, in Comparative Example 8 and Comparative Example 9, wherein the yellow index is above 40, and the content of azo compounds in parts excluding the base material in the composite semipermeable membrane is 0.05% by weight or more, although high neutral molecule removal properties were exhibited, water permeation performance was degraded; and in Comparative Example 8, it can be seen from Table 3 that the membrane performance was degraded by the immersion in hydrogen peroxide for 5 days.

These results show that high permeate flow rate, high neutral molecule removal properties, and durability are improved in Examples wherein the ratio of the number of azo groups to the number of benzene rings in the separating functional polyamide layer is 0.01 to 0.1, and the content of azo compounds in parts excluding the base material in the composite semipermeable membrane is less than 0.05% by weight.

INDUSTRIAL APPLICABILITY

The semipermeable membrane of the present invention produces a semipermeable membrane that has high desalination performance and is capable of rejecting at a high removal rate even substances that are nondissociative in the neutral range, which substances have been hardly rejected to a high extent by conventional semipermeable membranes. Therefore, this semipermeable membrane is capable of rejecting at a high removal rate, particularly, boron which has been hardly rejected to a high extent in desalination of sea water, and therefore can be suitably used in production of drinking water by reverse osmosis treatment.

The invention claimed is:

1. A semipermeable membrane which comprises a separating functional layer, wherein
   the material of the separating functional layer is a polyamide which is formed from an aromatic polyfunctional amine and a polyfunctional acid halide,
   an azo compound is retained in the separating functional layer in an amount in the range of 0.05% by weight to 0.5% by weight, and
   the separating functional layer has a yellow index of 10 to 40.

2. The semipermeable membrane according to claim 1, wherein said semipermeable membrane further comprises a base material layer together with the separating functional layer, and the azo compound is retained in a portion of the semipeimeable membrane exclusive of the base material layer in an amount in the range of 0.05% by weight to 0.5% by weight, based on the weight of the portion of the semipermeable membrane exclusive of the base material layer.

3. The semipermeable membrane according to claim 2, wherein the ratio of the number of azo groups to the number of benzene rings in the separating functional layer is in the range of 0.01 to 0.1.

4. The semipermeable membrane according to claim 1, wherein said semipermeable membrane comprises a base material layer, and a porous support membrane layer in addition to the separating functional layer,
wherein the porous support membrane layer is formed by casting a resin on the base material layer, and
wherein the azo compound is retained in a portion of the semipermeable membrane exclusive of the base material layer in an amount in the range of 0.05% by weight to 0.5% by weight, based on the weight of the portion of the semipermeable membrane exclusive of the base material layer.

5. The semipermeable membrane according to claim 4, wherein the separating functional layer is formed from a polycondensation reaction of a polyfunctional aromatic amine with a polyfunctional acid halide to form a polyamide, and
wherein the ratio of the number of azo groups to the number of benzene rings in the separating functional layer is in the range of 0.01 to 0.1.

6. The semipermeable membrane according to claim 1, wherein the aromatic polyfunctional amine of the separating functional layer contains primary aromatic amino groups and the semipermeable membrane is formed by a method comprising the steps of:
retaining the primary aromatic amino groups in the separating functional layer of the semipermeable membrane in an amount in the range 0.001% up to 2.0% by weight:
contacting the semipermeable membrane with a solution containing a compound that reacts with primary aromatic amino groups and forms a diazonium salt or derivatives thereof; then
contacting the semipermeable membrane with a solution containing a compound that reacts with the diazonium salt and induces a diazo coupling reaction; and
contacting the semipermeable membrane with a solution containing a reducing agent.

7. A method of producing the semipermeable membrane having at least a separating functional layer, the method comprising the steps of:
forming a semipermeable membrane having a m-phenylenediamine solute permeability coefficient in the range of $5.0 \times 10^{-7}$ to $1.0 \times 10^{-7}$ cm/sec wherein the separating functional layer is foimed from a polyfunctional amine having primary aromatic amino groups and a polyfunctional acid halide;
retaining the polyfunctional amine having primary aromatic amino groups in the separating functional layer of the semipermeable membrane in an amount in the range of 0.5% by weight to 2.0% by weight; and then
contacting the semipermeable membrane with a solution containing a compound that reacts with primary aromatic amino groups and forms a diazonium salt or derivatives thereof,
wherein the separating functional layer has a yellow index of 10 to 40 as defined in Japanese Industrial Standard JIS K 7373.

8. A method of producing a composite semipermeable membrane comprising a porous support membrane on which a separating functional polyamide layer is formed by a polycondensation reaction of a polyfunctional aromatic amine having primary aromatic amino groups with a polyfunctional acid halide, the method comprising the steps of:
retaining the polyfunctional amine having primary aromatic amino groups in the separating functional layer of the semipermeable membrane in an amount in the range 0.001% up to 2.0% by weight:
contacting the semipermeable membrane with a solution containing a compound that reacts with primary aromatic amino groups and forms a diazonium salt or derivatives thereof; then
contacting the semipermeable membrane with a solution containing a compound that reacts with the diazonium salt and induces a diazo coupling reaction; and
contacting the semipermeable membrane with a solution containing a reducing agent to produce the composite semipermeable membrane;
wherein the separating functional layer has a yellow index of 10 to 40 as defined in Japanese Industrial Standard JIS K 7373.

* * * * *